(12) United States Patent
Clark et al.

(10) Patent No.: US 7,467,262 B2
(45) Date of Patent: Dec. 16, 2008

(54) DATA PROCESSING SYSTEM, CACHE SYSTEM AND METHOD FOR SCRUBBING A DOMAIN INDICATION IN RESPONSE TO EXECUTION OF PROGRAM CODE

(75) Inventors: Leo J. Clark, Georgetown, TX (US); James S. Fields, Jr., Austin, TX (US); Guy L. Guthrie, Austin, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 11/136,642

(22) Filed: May 24, 2005

(65) Prior Publication Data

US 2006/0271741 A1 Nov. 30, 2006

(51) Int. Cl.
*G06F 12/00* (2006.01)
(52) U.S. Cl. ...................................... 711/141
(58) Field of Classification Search ........................ None
See application file for complete search history.

(56) References Cited

U.S. PATENT DOCUMENTS

| | | | |
|---|---|---|---|
| 6,415,358 B1 | 7/2002 | Arimilli et al. | |
| 2006/0036815 A1* | 2/2006 | Pape | 711/148 |

* cited by examiner

*Primary Examiner*—Reginald G. Bragdon
*Assistant Examiner*—Thanh Vo
(74) *Attorney, Agent, or Firm*—Casimer K. Salys; Dillon & Yudell LLP

(57) ABSTRACT

In response to execution of program code, a control register within scrubbing logic in a local coherency domain is initialized with at least a target address of a target memory block. In response to the initialization, the scrubbing logic issues to at least one cache hierarchy in a remote coherency domain a domain indication scrubbing request targeting a target memory block that may be cached by the at least one cache hierarchy. In response to receipt of a coherency response indicating that the target memory block is not cached in the remote coherency domain, a domain indication in the local coherency domain is updated to indicate that the target memory block is cached, if at all, only within the local coherency domain.

15 Claims, 11 Drawing Sheets

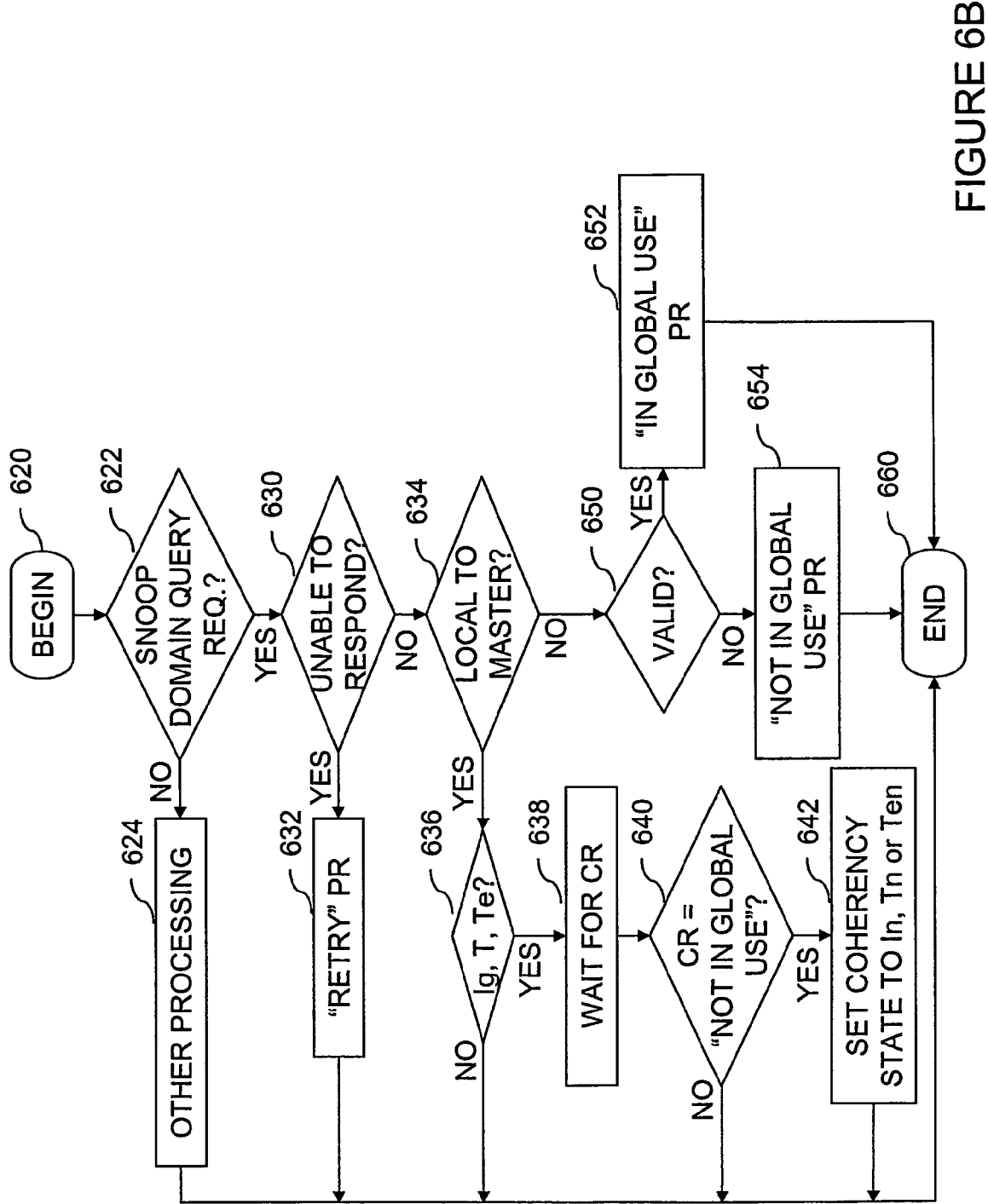

DATA PROCESSING SYSTEM, CACHE SYSTEM AND METHOD FOR SCRUBBING A DOMAIN INDICATION IN RESPONSE TO EXECUTION OF PROGRAM CODE

CROSS-REFERENCE TO RELATED APPLICATION(S)

The present application is related to the following copending applications, which are assigned to the assignee of the present invention and incorporated herein by reference in their entireties:

1. U.S. patent application Ser. No. 11/136,652;
2. U.S. patent application Ser. No. 11/136,651.

BACKGROUND OF THE INVENTION

1. Technical Field

The present invention relates in general to data processing and, in particular, to data processing in a cache coherent data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherency states stored in association with the cache lines of each cache hierarchy, as well as a set of coherency messages utilized to communicate the cache state information between cache hierarchies. In a typical implementation, the coherency state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

In some cache coherency protocols, one or more coherency states are either not updated or only imprecisely updated in response to subsequent operations. Consequently, these coherency states may become "stale" over time in that they no longer accurately reflect a system-wide coherency state of the associated memory blocks. The present invention recognizes that the existence of "stale" coherency states can lead to system operations being performed that would otherwise not be required if the "stale" coherency states were updated and/or removed.

SUMMARY OF THE INVENTION

In view of the foregoing, the present invention provides an improved cache coherent data processing system, cache system and method of data processing in a cache coherent data processing system.

In one embodiment, cache scrubbing logic in a local coherency domain issues a domain query request to at least one cache hierarchy in a remote coherency domain. The domain query request is a non-destructive probe of a coherency state associated with a target memory block by the at least one cache hierarchy. A coherency response to the domain query request is received. In response to the coherency response indicating that the target memory block is not cached in the remote coherency domain, a domain indication in the local coherency domain is reset to indicate that the target memory block is cached, if at all, only within the local coherency domain.

In another embodiment, cache scrubbing logic in a local coherency domain issues to at least one cache hierarchy in a remote coherency domain a domain reset request that forces invalidation of any cached copy of a target memory block then held in said remote coherency domain. A coherency response to said domain reset request is received. In response to said coherency response indicating that said target memory block is not cached in said remote coherency domain, resetting a domain indication in a system memory of said local coherency domain to indicate that said target memory block is cached, if at all, only within said local coherency domain.

In yet another embodiment, in response to execution of program code, a control register within cache scrubbing logic in a local coherency domain is initialized with at least a target address of a target memory block. In response to the initialization, the cache scrubbing logic issues to at least one cache hierarchy in a remote coherency domain a cache scrubbing request targeting a target memory block that may be cached by the at least one cache hierarchy. In response to receipt of a coherency response indicating that the target memory block is not cached in the remote coherency domain, a domain indication in the local coherency domain is reset to indicate that the target memory block is cached, if at all, only within the local coherency domain.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 6B is a high level logical flowchart of a method by which a cache snooper processes a passive cache scrubbing operation in accordance with the present invention;

DETAILED DESCRIPTION OF ILLUSTRATIVE EMBODIMENT

I. Exemplary Data Processing System

Figure 1:
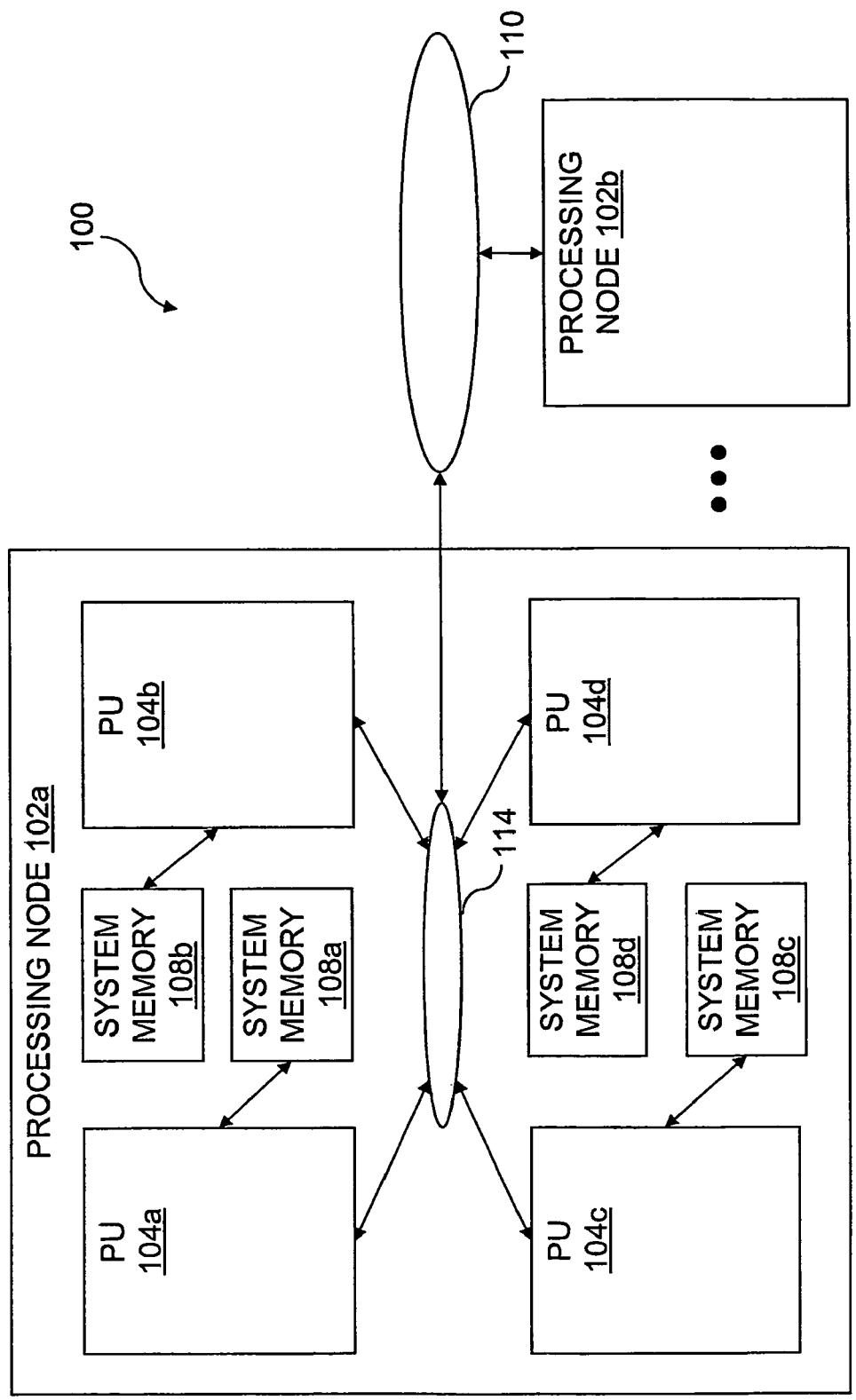
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102*a*, 102*b* for processing data and instructions. Processing nodes 102*a*, 102*b* are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104*a*-104*d*, each preferably realized as a respective integrated circuit. The processing units 104*a*-104*d* within each processing node 102 are coupled for communication by a local interconnect 114, which, like system interconnect 110, may be implemented with one or more buses and/or switches.

The devices coupled to each local interconnect 114 include not only processing units 104, but also one or more system memories 108*a*-108*d*. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
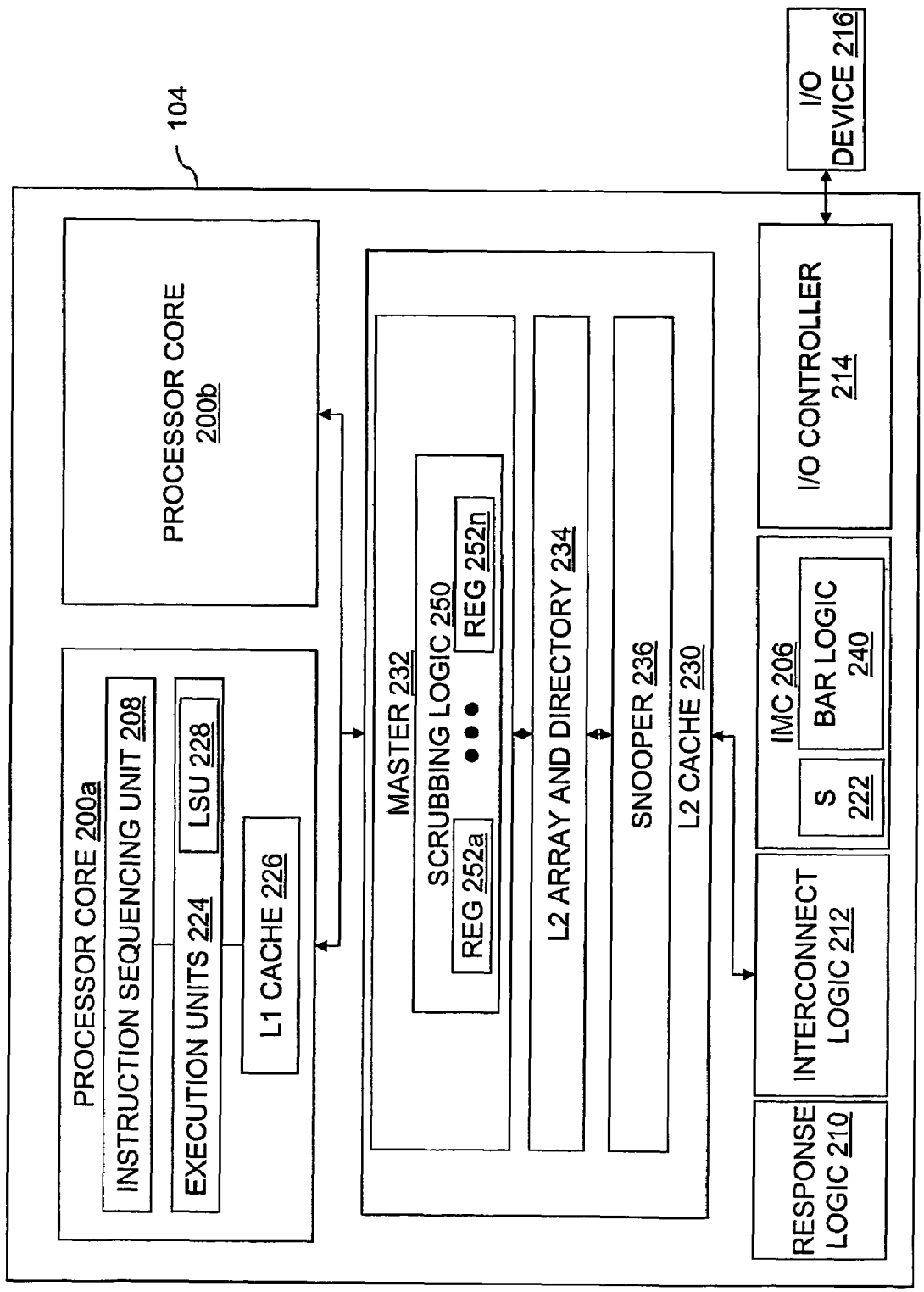
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200*a*, 200*b* for independently processing instructions and data. Each processor core 200 includes at least an instruction sequencing unit (ISU) 208 for fetching and ordering instructions for execution and one or more execution units 224 for executing instructions. As discussed further below, execution units 224 preferably include a load-store unit (LSU) 228 for executing memory access instructions that references a memory block or cause the generation of an operation referencing a memory block.

The operation of each processor core 200 is supported by a multi-level volatile memory hierarchy having at its lowest level shared system memories 108*a*-108*d*, and at its upper levels one or more levels of cache memory. In the depicted embodiment, each processing unit 104 includes an integrated memory controller (IMC) 206 that controls read and write access to a respective one of the system memories 108*a*-108*d* within its processing node 102 in response to requests received from processor cores 200*a*-200*b* and operations snooped by a snooper (S) 222 on the local interconnect 114. IMC 206 determines the addresses for which it is responsible by reference to base address register (BAR) logic 240.

In the illustrative embodiment, the cache memory hierarchy of processing unit 104 includes a store-through level one (L1) cache 226 within each processor core 200 and a level two (L2) cache 230 shared by all processor cores 200*a*, 200*b* of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200*a*-200*b*. Master 232 includes cache scrubbing logic 250, which, as described further below, may be utilized to update the coherency state(s) and/or domain indicators of one or more memory blocks that may be cached in distributed locations within data processing system 100. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, L5 etc.) of on-chip or off-chip in-line or lookaside cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
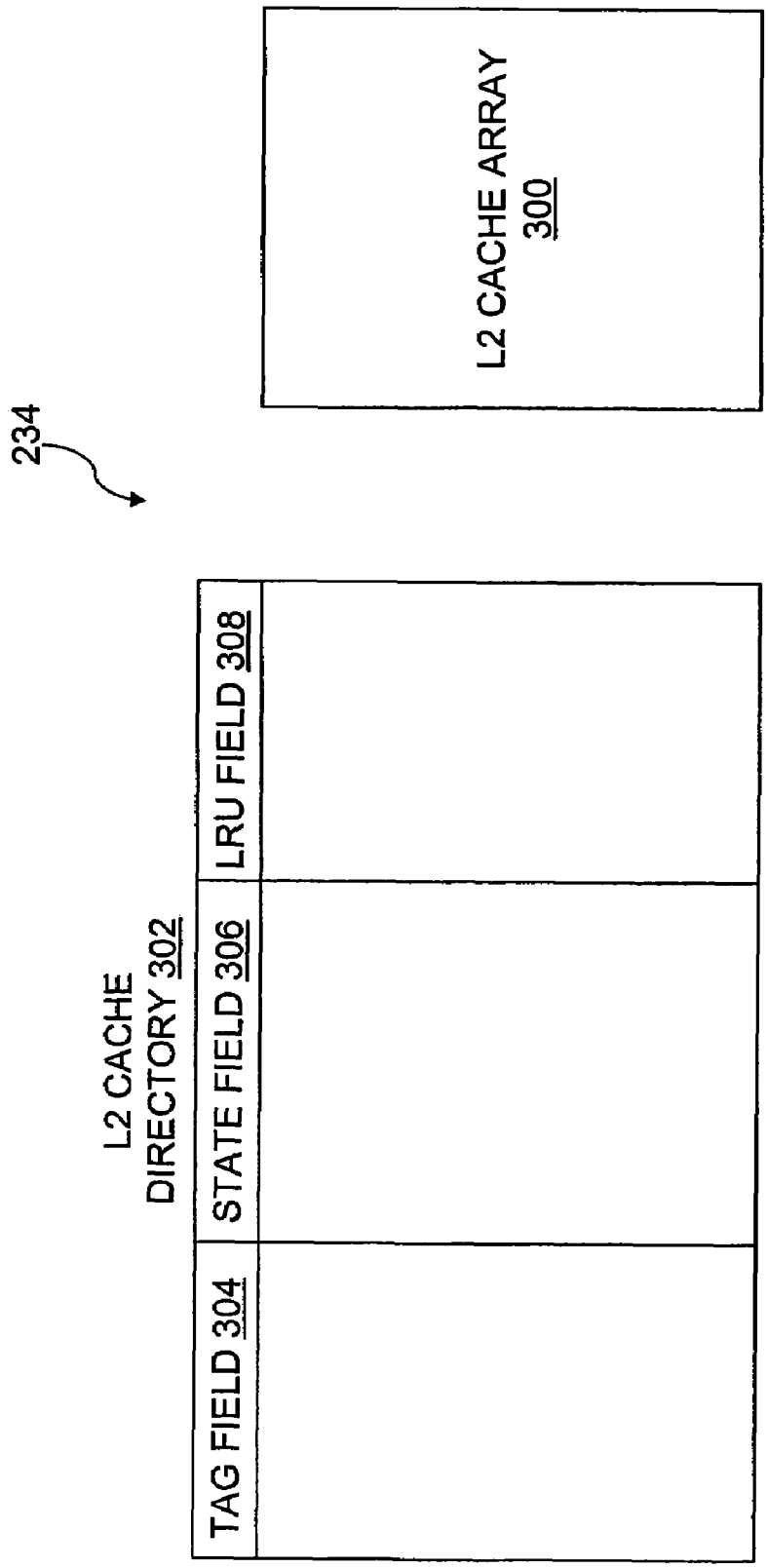
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

II. Exemplary Operation

Figure 4:
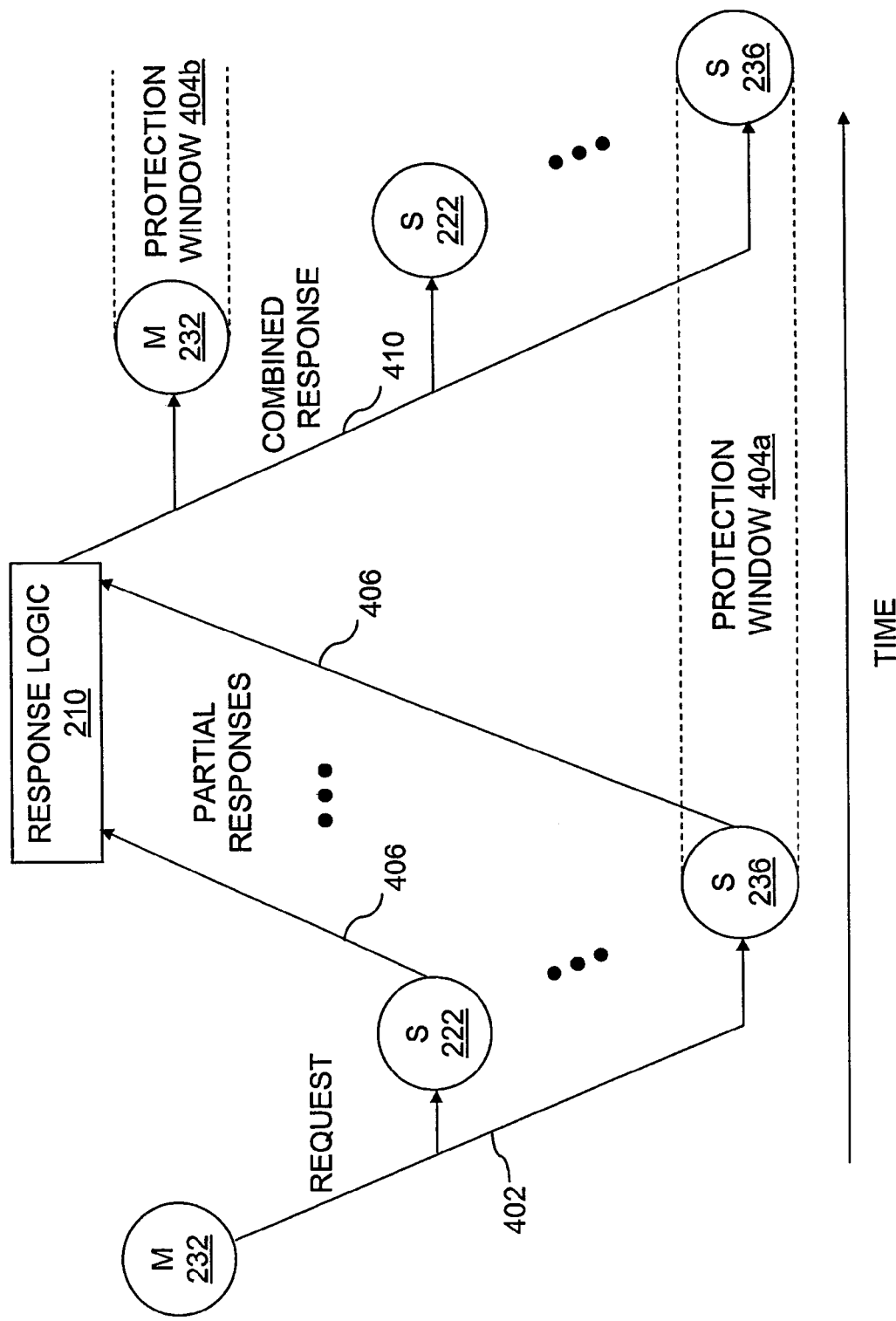
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. The operation begins when a master 232 of an L2 cache 230 (or another master, such as an I/O controller 214) issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

nect 114 and/or system interconnect 110 only if the request 402 cannot be serviced internally by a processing unit 104. Each snooper 222, 236 that receives request 402 may provide a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to the scope restrictions discussed below, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" operations invalidating the requested memory block in one or more L2 caches 230 are required.

In response to receipt of combined response 410, one or more of master 232 and snoopers 222, 236 typically perform

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique cached copy of a memory block without regard to its present state and subsequently modify its contents; requires destruction of other copies, if any |
| DCBDQ (Data Cache Block Domain Query) | Non-destructive probe requesting response indicating if a memory block is cached in a data-valid state outside of the coherency domain of the master |
| DCBDR (Data Cache Block Domain Reset) | Requests reset of domain indicator of a memory block to "local" and any necessary invalidation of cached copies of the memory block held outside of the local coherency domain |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 222 of memory controllers 206 (FIG. 1). In general, with some exceptions, the snooper 236 in the same L2 cache 230 as the master 232 of request 402 does not snoop request 402 (i.e., there is generally no self-snooping) because a request 402 is transmitted on local interconnect one or more operations in order to service request 402. These operations may include supplying data to master 232, invalidating or otherwise updating the coherency state of data cached in one or more L2 caches 230, performing castout operations, writing back data to a system memory 108, etc. If required by request 402, a requested or target memory block may be transmitted to or from master 232 before or after the generation of combined response 410 by response logic 210.

In the following description, the partial response of a snooper 222, 236 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has a queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling a present inability to service the request due to absence of a required resource.

Hereafter, a snooper 222, 236 providing a partial response indicating that the snooper has available all internal resources required to presently service a request, if required, is said to "affirm" the request. For snoopers 236, partial responses affirming a snooped operation preferably indicate the cache state of the requested or target memory block at that snooper 236. A snooper 222, 236 providing a partial response indicating that the snooper 236 does not have available all internal resources required to presently service the request may be said to be "possibly hidden" or "unable" to service the request. Such a snooper 236 is "possibly hidden" or "unable" to service a request because the snooper 236, due to lack of an available instance of snoop logic or present access to L2 cache directory 302, cannot "affirm" the request in sense defined above and has, from the perspective of other masters 232 and snoopers 222, 236, an unknown coherency state.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, multiple L2 caches 230 distributed throughout data processing system 100 are permitted to hold copies of the same memory block in a "special" shared coherency state that permits these caches to supply the memory block to requesting L2 caches 230 using cache-to-cache intervention. In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a particular memory block in the "special" shared coherency state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain. One example of such a "special" shared state (i.e., Sr) is described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104*a* of processing node 102*a* has a bus read operation to issue, then processing unit 104*a* may elect to first broadcast the bus read operation to all participants within its own coherency domain (e.g., processing node 102*a*), but not to participants in other coherency domains (e.g., processing node 102*b*). A broadcast operation transmitted to only those participants within the same coherency domain as the master of the operation is defined herein as a "local operation". If the local bus read operation can be serviced within the coherency domain of processing unit 104*a*, then no further broadcast of the bus read operation is performed. If, however, the partial responses and combined response to the local bus read operation indicate that the bus read operation cannot be serviced solely within the coherency domain of processing node 102*a*, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system. Examples of local and global operations are described in detail in U.S. patent application Ser. No. 11/055,305, which is incorporated herein by reference in its entirety.

In a preferred embodiment, the scope of an operation is indicated in a bus operation by a local/global scope indicator (signal), which in one embodiment may comprise a 1-bit flag. Forwarding logic 212 within processing units 104 preferably determines whether or not to forward an operation, received via local interconnect 114 onto system interconnect 110 based upon the setting of the local/global scope indicator (signal) in the operation.

V. Domain Indicators

Figure 5:
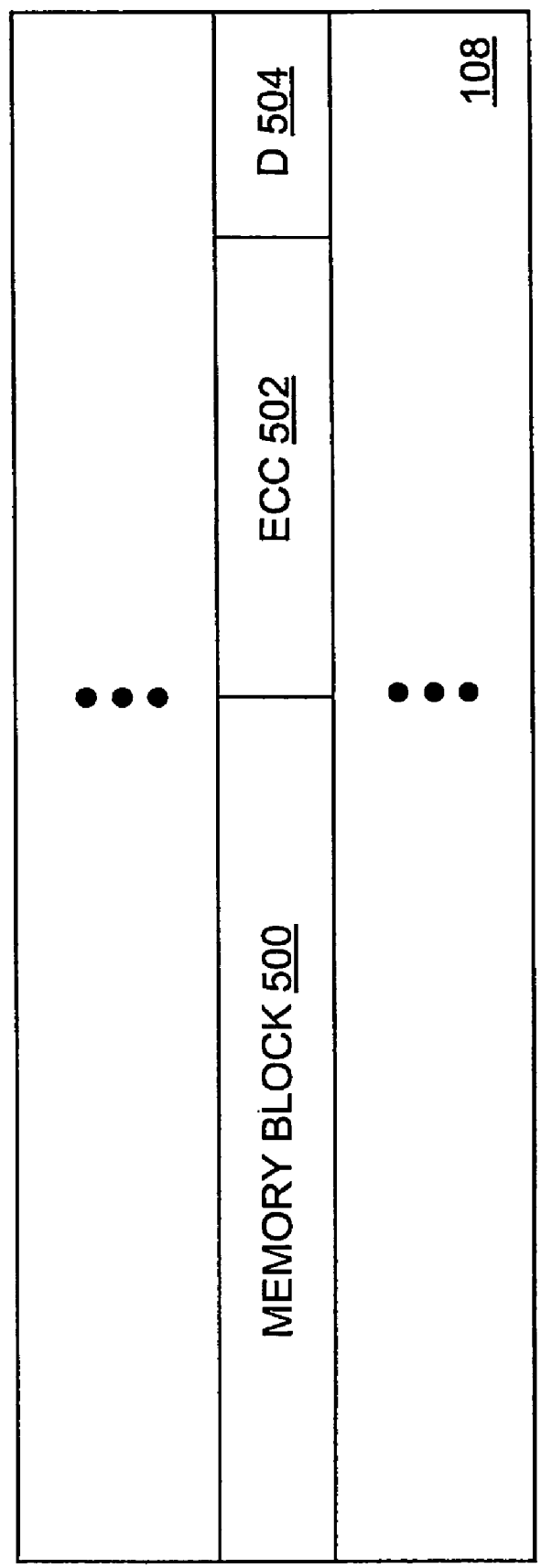
FIG. 5 illustrates a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Memory controllers 206 (and L2 caches 230) that source a memory block in response to an operation preferably transmit the associated domain indicator 504 in conjunction with the requested memory block.

VI. Exemplary Coherency Protocol

The present invention preferably implements a cache coherency protocol designed to leverage the implementation of data delivery and coherency domains as described above. In a preferred embodiment, the cache coherency states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache in a remote coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache state | HPC? | Unique? | Data source? | Consistent with LPC? | Cached outside local domain? | Legal concurrent states |
|---|---|---|---|---|---|---|
| M | yes | yes | yes, before CR | no | no | I, Ig, In (& LPC) |
| Me | yes | yes | yes, before CR | yes | no | I, Ig, In (& LPC) |
| T | yes | unknown | yes, after CR if none provided before CR | no | unknown | Sr, S, I, Ig, In (& LPC) |
| Tn | yes | unknown | yes, after CR if none provided before CR | no | no | Sr, S, I, Ig, In (& LPC) |
| Te | yes | unknown | yes, after CR if none provided before CR | yes | unknown | Sr, S, I, Ig, In (& LPC) |
| Ten | yes | unknown | yes, after CR if none provided before CR | yes | no | Sr, S, I, Ig, In (& LPC) |
| Sr | no | unknown | yes, before CR | unknown | unknown | T, Tn, Te, Ten, S, I, Ig, In (& LPC) |
| S | no | unknown | no | unknown | unknown | T, Tn, Te, Ten, Sr, S, I, Ig, In (& LPC) |
| I | no | n/a | no | n/a | unknown | M, Me, T, Tn, Te, Ten, Sr, S, I, Ig, In (& LPC) |
| Ig | no | n/a | no | n/a | Assumed so, in absence of other information | M, Me, T, Tn, Te, Ten, Sr, S, I, Ig, In (& LPC) |
| In | no | n/a | no | n/a | Assumed not, in absence of other information | M, Me, T, Tn, Te, Ten, Sr, S, I, Ig, In (& LPC) |

A. Ig State

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain. The Ig indication is preferably imprecise, meaning that it may be incorrect without a violation of coherency.

The Ig state is formed in a lower level cache in response to that cache providing a requested memory block to a requestor in another coherency domain in response to an exclusive access request (e.g., a bus RWITM operation). In some embodiments of the present invention, it may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed any time that a cache sources a memory block to a remote coherency domain in response to an exclusive access request.

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries and by cache scrubbing, as described further below.

Several rules govern the selection and replacement of Ig cache entries. First, if a cache selects an Ig entry as the victim for replacement, a castout of the Ig entry is performed (unlike the case when an I entry is selected). Second, if a request that causes a memory block to be loaded into a cache hits on an Ig cache entry in that same cache, the cache treats the Ig hit as a cache miss and performs a castout operation with the Ig entry as the selected victim. The cache thus avoids avoid placing two copies of the same address tag in the cache directory. Third, the castout of the Ig state is preferably performed as a local operation, or if performed as a global operation, ignored by by memory controllers of non-local coherency domains. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is written back to the LPC (if local to the cache performing the castout).

Implementation of an Ig state in accordance with the present invention improves communication efficiency by maintaining a cached domain indicator for a memory block in a coherency domain even when no valid copy of the memory block remains cached in the coherency domain. As a consequence, an HPC for a memory block can service an exclusive access request (e.g., bus RWITM operation) from a remote coherency domain without retrying the request and performing a push of the requested memory block to the LPC.

B. In State

The In state is defined herein as a cache coherency state indicating (1) the associated memory block in the cache array is invalid, (2) the address tag in the cache directory is valid, and (3) a copy of the memory block identified by the address tag is likely cached, if at all, only by one or more other cache hierarchies within the local coherency domain. The In indication is preferably imprecise, meaning that it may be incorrect without a violation of coherency. The In state is formed in a lower level cache in response to that cache providing a requested memory block to a requester in the same coherency domain in response to an exclusive access request (e.g., a bus RWITM operation).

Because cache directory entries including an In state carry potentially useful information, it is desirable in at least some implementations to preferentially retain entries in the In state over entries in the I state (e.g., by modifying the Least Recently Used (LRU) algorithm utilized to select a victim cache entry for replacement). As In directory entries are retained in cache, it is possible for some In entries to become "stale" over time in that a cache whose exclusive access request caused the formation of the In state may itself supply a shared copy of the memory block to a remote coherency domain without notification to the cache holding the address tag of the memory block in the In state. In such cases, the "stale" In state, which incorrectly indicates that a local operation should be issued instead of a global operation, will not cause any coherency errors, but will merely cause some operations to be erroneously first issued as local operations, rather than as global operations. Occurrences of such inefficiencies will be limited in duration by the eventual replacement of the "stale" In cache entries. In a preferred embodiment, cache entries in the In coherency state are not subject to castout, but are instead simply replaced. Thus, unlike Ig cache entries, In cache entries are not utilized to update domain indicators 504 in system memories 108.

Implementation of an In state in accordance with the present invention improves communication efficiency by maintaining a cached domain indicator for a memory block that may be consulted by a master in order to select a local scope for one of its operations. As a consequence, bandwidth on system interconnect 110 and local interconnects 114 in other coherency domains is conserved.

C. Sr State

In the operations described below, it is useful to be able to determine whether or not a lower level cache holding a shared requested memory block in the Sr coherency state is located within the same domain as the requesting master. In one embodiment, the presence of a "local" Sr snooper within the same domain as the requesting master can be indicated by the response behavior of a snooper at a lower level cache holding a requested memory block in the Sr coherency state. For example, assuming that each bus operation includes a range indicator indicating whether the bus operation has crossed a domain boundary (e.g., an explicit domain identifier of the master or a single local/not local range bit), a lower level cache holding a shared memory block in the Sr coherency state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

TABLE III

| Domain of master of read-type request | Cache state in directory | Partial response (adequate resources available) | Partial response (adequate resources unavailable) |
| --- | --- | --- | --- |
| "local" (i.e., within same domain) | Sr | Sr' affirm | Sr' possibly hidden |
| "remote" (i.e., not within same domain) | Sr | S' affirm | S' possibly hidden |
| "local" (i.e., within same domain) | S | S' affirm | S' possibly hidden |
| "remote" (i.e., not within same domain) | S | S' affirm | S' possibly hidden |

Assuming the response behavior set forth above in Table III, the average data latency for shared data can be significantly decreased by increasing the number of shared copies of memory blocks distributed within an SMP data processing system that may serve as data sources.

VII. Cache Scrubbing Operations

As noted above, Ig directory entries retained in an L2 cache directory 302 can become "stale" over time in that a non-local L2 cache 230 whose exclusive access request caused the formation of the Ig state may deallocate or writeback its copy of the memory block without notification to the L2 cache 230 holding the address tag of the memory block in the Ig state. In such cases, the "stale" Ig state, which incorrectly indicates that a global operation should be issued instead of a local operation to obtain a copy of the associated memory block, will not cause any coherency errors, but will merely cause some operations, which could otherwise be serviced utilizing a local operation, to be issued as global operations. Other coherency states having an explicit or implied "global" attribute (e.g., T and Te) may similarly become stale due to an absence of a precise coherency state update mechanism. The communication inefficiencies occasioned by these "stale" coherency states may be reduced by cache scrubbing, as is now described with reference to FIGS. 6A-8B.

Figure 6A:
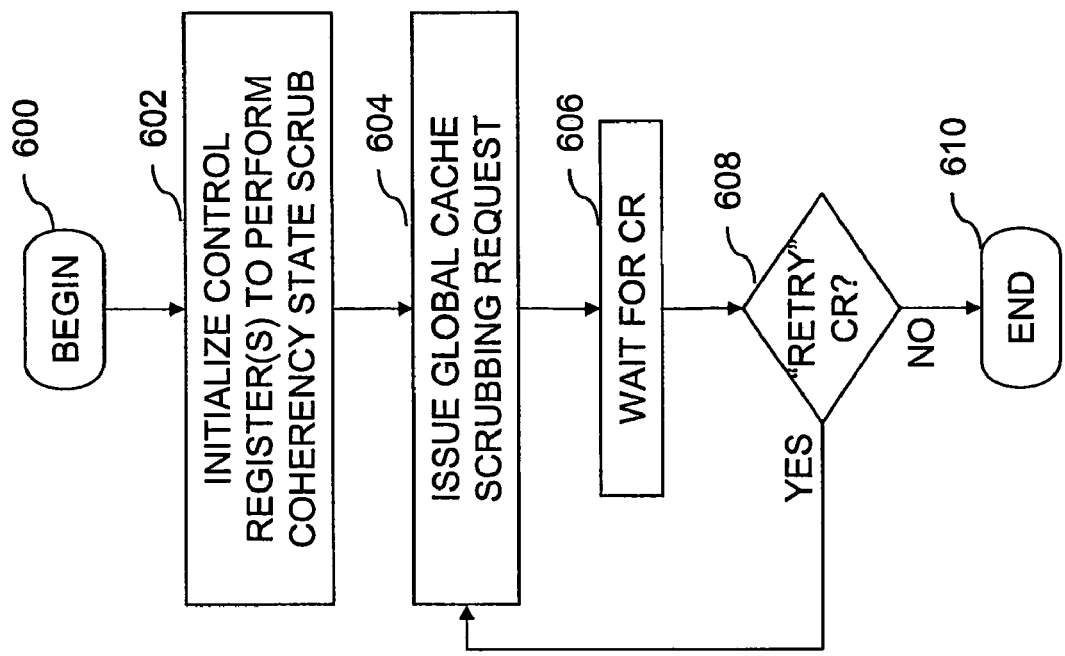
FIG. 6A is a high level logical flowchart of a method of initiating a cache scrubbing operation in accordance with the present invention.

Referring first to FIG. 6A, there is depicted a high level logical flowchart of a method of initiating a cache scrubbing operation in accordance with the present invention. As shown, the process begins at block 600 and thereafter proceeds to block 602, which illustrates initializing one or more control registers 252a-252n within cache scrubbing logic 250 to establish the parameters of a cache scrubbing operation. In one embodiment, these parameters include at least an indication of one or more target real memory addresses to be scrubbed, and may further include an indication of a type of scrubbing operation to be performed on the target address(es). For example, cache scrubbing logic 250 may support one or more of the following types of cache scrubbing operations:

(1) a passive cache scrubbing operation in which a domain indication (e.g., domain indicator 504) associated with a memory block is updated to indicate "local", if possible, based upon the response to a non-destructive probe of the data processing system, or (2) an active cache scrubbing operation in which a domain indication (e.g., domain indicator 504) associated with a memory block is forcibly reset to indicate "local" in response to a potentially destructive request communicated to cache memories in the data processing system.

Although other embodiments are possible, it is assumed herein for ease of implementation that the control registers 252 of the cache scrubbing logic 250 of an L2 cache 230 may only be initialized to scrub target addresses allocated to system memories 108 within the same coherency domain as cache scrubbing logic 250. Cache scrubbing logic 250 may verify that the target address(es) specified by the settings of control registers 252a-252n are allocated to one or more system memories 108 in its coherency domain, for example, by reference to BAR logic 240 or similar base address register(s) associated with L2 cache 230. In this embodiment, target addresses allocated to a system memory 108 outside of the local coherency domain of the L2 cache 230 are simply ignored by cache scrubbing logic 250.

Figure 8A:
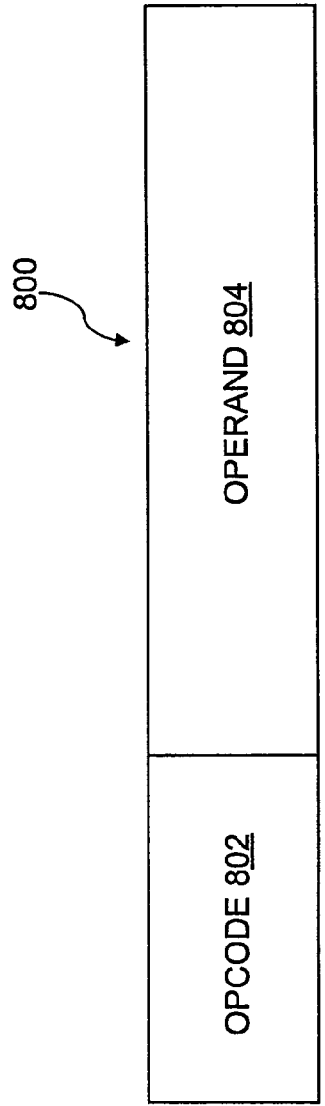
FIG. 8A depicts an exemplary cache scrubbing instruction for initiating a passive or active cache scrubbing operation in accordance with the present invention.
Figure 8B:
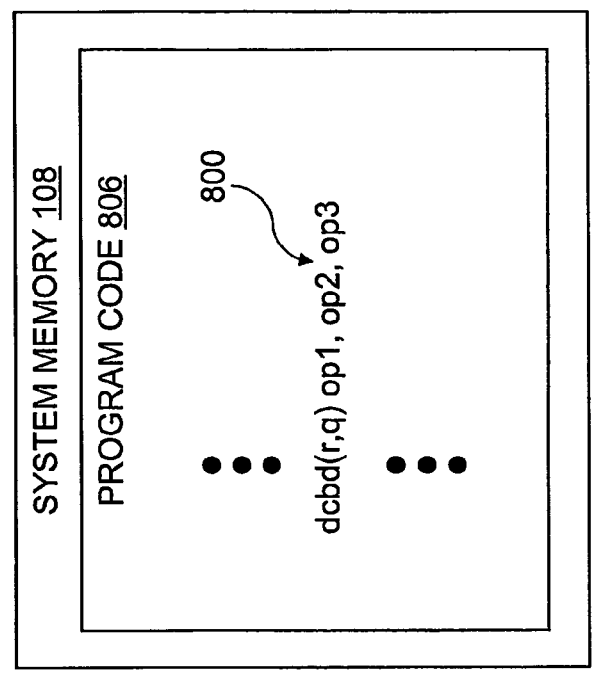
FIG. 8B illustrates exemplary program code including a cache scrubbing instruction in accordance with the present invention.

The initialization of control registers 252 as depicted at block 602 of FIG. 6A can be performed, for example, by software or firmware through the execution of one or more memory-mapped I/O write operations, or alternatively or additionally, through the execution or processing by an execution unit 224 (e.g., LSU 228) of a cache scrubbing instruction. For example, FIG. 8A illustrates the format of an exemplary cache scrubbing instruction 800 including an opcode field 802 and an operand field 804. In one embodiment, opcode field 802 supports values including a first binary value specifying a passive cache scrubbing operation designated by the mnemonic Data Cache Block Domain Query (DCBDQ) and a second binary value specifying an active cache scrubbing operation designated by the mnemonic Data Cache Block Domain Reset (DCBDR). Operand field 804 identifies one or more target cache blocks of the cache scrubbing operation utilizing a conventional addressing mode. As depicted in FIG. 8B, a cache scrubbing instruction 800 generally forms a portion of computer usable program code 806 that is stored at least partially within a computer usable medium (e.g., system memory 108) and that is subject to execution or processing by processor cores 200.

Following the initialization depicted at block 602, the process shown in FIG. 6A proceeds to block 604, which depicts cache scrubbing logic 250 of the master 232 of an L2 cache 230 issuing a respective cache scrubbing request of global scope on interconnects 114, 110 for each target address to be scrubbed. The cache scrubbing request can be issued, for example, in response to cache scrubbing logic 250 polling one or more control registers 252 to detect the initialization of control registers 252, or alternatively, in response to receipt by cache scrubbing logic 250 of master 232 of a cache scrubbing operation that initializes control registers 252 from an associated processor core 200 in response to execution of a cache scrubbing instruction (e.g., a DCBDQ or DCBDR instruction). The cache scrubbing request issued on interconnects 114, 110 preferably indicates a target address, and if more than one type of cache scrubbing is implemented, a transaction type indicating whether passive or active cache scrubbing is requested. Hereafter, a passive cache scrubbing request is referred to as a "domain query" request, and an active cache scrubbing request is referred to as a "domain reset" request. It should be noted that the cache scrubbing request is issued irrespective of the coherency state of the target memory block in the initiating L2 cache 230.

Following the issuance of the cache scrubbing request, cache scrubbing logic 250 of master 232 awaits the system-wide combined response (CR) to the cache scrubbing request, as shown at block 606. If the combined response indicates "retry", the process returns to block 604, which illustrates cache scrubbing logic 250 reissuing the cache scrubbing request. If the combined response does not indicate "retry," the cache scrubbing request was successful, and the process ends at block 610.

With reference now to FIG. 6B, there is depicted a high level logical flowchart of a method by which a cache snooper, such as an L2 cache snooper 236, processes a domain query request in accordance with the present invention. As shown, the process begins at block 620 in response to receipt by an L2 cache snooper 236 of a request on its local interconnect 114. In response to receipt of the request, snooper 236 determines at block 622 whether or not the request is a domain query request. If not, snooper 236 performs other processing, as shown at block 624, and the process ends at block 660. If, however, snooper 236 determines at block 622 that the request is a domain query request (including a domain query request originated by the cache scrubbing logic 250 in the same L2 cache 230), snooper 236 further determines at block 630 whether or not it is presently able to substantively respond to the domain query request (e.g., whether it has an available instance of snoop logic and current access to L2 cache directory 302). If snooper 236 is presently unable to substantively respond to the domain query request, snooper 236 provides a partial response (PR) indicating "retry", as depicted at block 632, and processing of the domain query request ends at block 660.

Assuming that snooper 236 is able to substantively respond to the domain query request, snooper 236 determines at block 634 whether it resides within the same coherency domain as the initiating L2 cache 230 that originally issued the domain query request. For example, snooper 236 may make the determination illustrated at block 634 by examining the range bit (or in other embodiments, the domain identifier of the initiating L2 cache 230 or target address) contained in the domain query request. If snooper 236 determines at block 634 that it is not within the same coherency domain as the initiating L2 cache 230, snooper 236 provides a partial response in accordance with the coherency state of the target address with respect to its L2 cache directory 302. That is, if the L2 cache directory 302 of the snooper 236 indicates that the target address has a data-valid coherency state (e.g., M, Me, T, Te, Tn, Ten, Sr, or S), snooper 236 provides a partial response indicating "in global use," as shown at block 652. Conversely, if the L2 cache directory 302 of the snooper 236 indicates that the target address has a data-invalid coherency state (e.g., Ig, In, or I), snooper 236 provides a partial response indicating "not in global use," as shown at block 654. Following either of blocks 652 and 654, the process ends at block 660.

Referring back to block 634, if the snooper 236 determines that it is within the same coherency domain as (i.e., local to) the initiating L2 cache 230, snooper 236 also determines the coherency state of the target memory address with respect to its L2 cache directory 302, as illustrated at block 636. If the target memory address does not have an associated coherency state recorded within L2 cache directory 302 that provides an explicit or implicit indication that a copy of the target memory block may be cached outside of the local coherency domain (e.g., the coherency state is other than Ig, T or Te), no further processing need be performed, and the process ends at block 660. If, however, snooper 236 determines that the target memory address of the domain query request has an associated coherency state recorded within L2 cache directory 302 that provides an explicit or implicit indication that a copy of the target memory block may be cached outside of the local coherency domain (e.g., the coherency state is Ig, T or Te), snooper 236 awaits the combined response for the domain query request, as shown at block 638.

As described above, at least one instance of response logic 210 (e.g., the response logic 210 in the initiating processing unit 104) combines partial responses generated in response to the domain query request to determine the combined response. In one embodiment, response logic 210 generates the combined response in accordance with Table IV, in which "Y" indicates the presence of a partial response, "X" represents a "don't care", and a dash ("–") represents the absence of a partial response.

TABLE IV

| Partial Responses | Retry | In global use | Not in global use | Combined response |
|---|---|---|---|---|
| Retry | Y | X | X | Retry |
| In global use | Y | X | X | Retry |
| Not in global use | Y | X | X | Retry |
| In global use | — | X | X | In global use |
| Not in global use | — | — | X | Not in global use |

Thus, in this embodiment, if any snooper 236, 222 provides a partial response indicating "retry", combined response logic 210 generates a combined response indicating "retry" regardless of the presence or absence of any other partial response. If no snooper 236, 222 generates a partial response indicating "retry" and at least one snooper 236 generates a partial response indicating "in global use", combined response logic 210 generates a combined response indicating "in global use." Finally, if no snooper 236, 222 provides a partial response indicating "retry" or "in global use", combined response logic 210 generates a combined response indicating "not in global use."

In response to receipt of the combined response to the domain query request, snooper 236 determines at block 640 whether or not the combined response indicates that the target memory block is "not in global use" (i.e., that the target memory block is cached, if at all, only within the local coherency domain. If the combined response does not indicate that the target memory block is "not in global use", no further processing need be performed, and the process ends at block 660. If, however, the combined response of the domain query request indicates that the target memory block is "not in global use," then snooper 236 preferably updates the entry associated with the target address in its L2 cache directory 302 from Ig to In or from T to Tn or from Te to Ten. In this manner, the coherency state of the target memory block is updated to reflect the domain information provided by the system-wide response to the domain query request. Thereafter, the process ends at block 660.

Figure 6C:
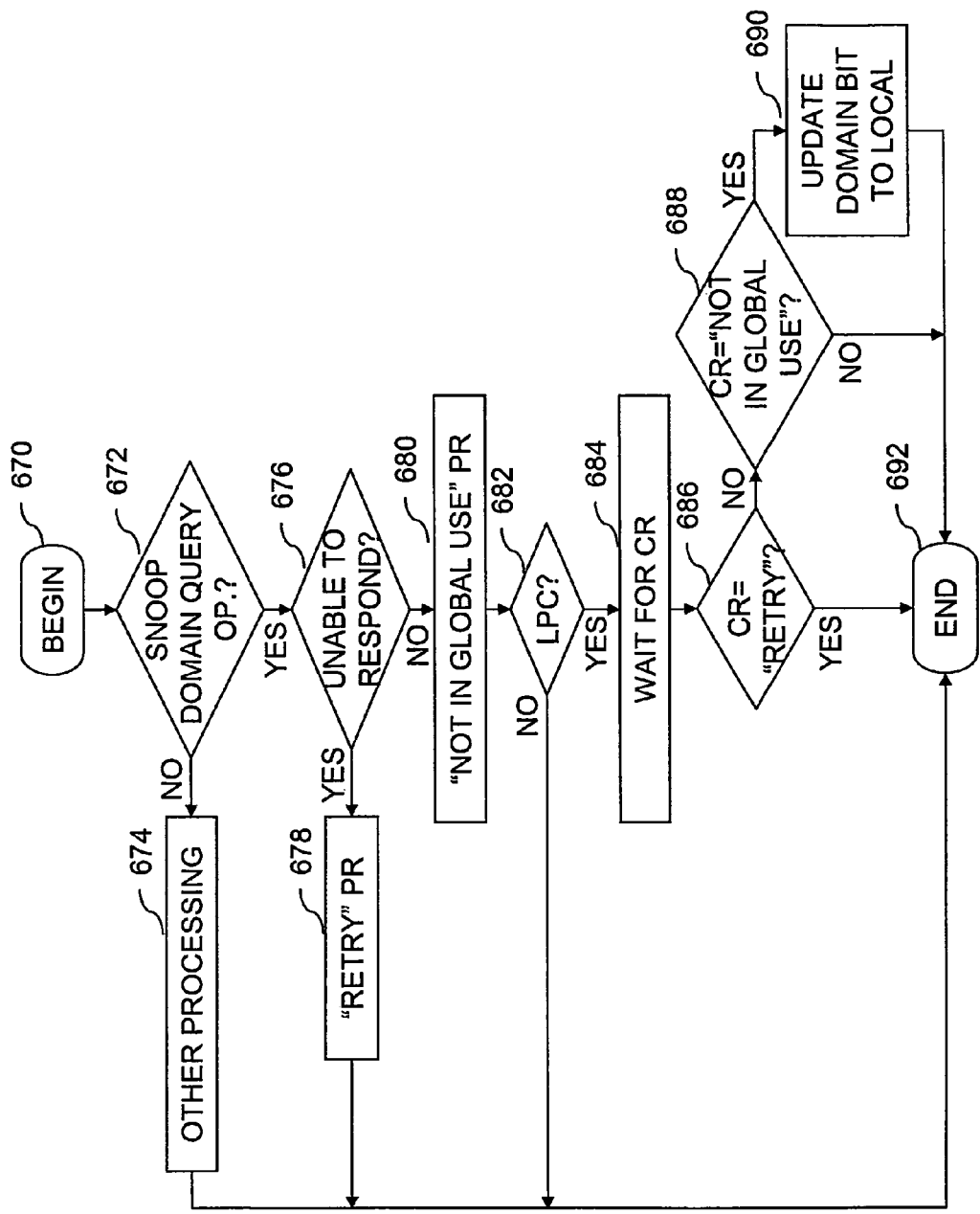
FIG. 6C is a high level logical flowchart of a method by which a memory controller snooper processes a passive cache scrubbing operation in accordance with the present invention.

Referring now to FIG. 6C, there is depicted a high level logical flowchart of a method by which a memory controller snooper, such as a snooper 222, processes a domain query request in accordance with the present invention. As shown, the process begins at block 670 in response to receipt by a memory controller snooper 222 of a request on its local interconnect 114. In response to receipt of the request, snooper 222 determines at block 672 whether or not the request is a domain query request. If not, snooper 222 performs other processing, as shown at block 674, and the process ends at block 692. If, however, snooper 222 determines at block 672 that the request is a domain query request, snooper 222 further determines at block 676 whether or not it is presently able to substantively respond to the domain query request (e.g., whether it has an available instance of snoop logic). If snooper 222 is presently unable to substantively respond to the domain query request, snooper 222 provides a partial response (PR) indicating "retry", as depicted at block 678, and processing of the domain query request ends at block 692.

Assuming that snooper 222 is presently able to substantively respond to the domain query request, snooper 222 optionally provides a "not in global use" partial response, as depicted at block 680, and determines whether it is the LPC for the target address, as shown at block 682. For example, snooper 222 may make the determination illustrated at block 682 by reference to BAR logic 240. If snooper 222 determines at block 682 that it is not the LPC for the target address, no further processing of the domain query request need be performed, and the process ends at block 692.

Referring back to block 682, if the snooper 222 determines that it is the LPC for the target address, snooper 222 awaits the combined response for the domain query request, as shown at block 684. In response to receipt of the combined response to the domain query request, snooper 222 determines at blocks 686 and 688 whether or not the combined response indicates that the target memory block is "not in global use" (i.e., that the target memory block is cached, if at all, only within the local coherency domain). If the combined response does not indicate that the target memory block is "not in global use", no further processing need be performed by snooper 222, and the process ends at block 692. If, however, the combined response of the domain query request indicates that the target memory block is "not in global use," then snooper 222 resets the domain indicator 504 of the target memory block in system memory 108 to indicate "local" utilizing a read-modify-write operation (block 690). In this manner, domain indicator 504 of the target memory block is updated in system memory 108 to reflect the domain information provided by the system-wide response to the domain query request. Thereafter, the process ends at block 692.

Figure 7A:
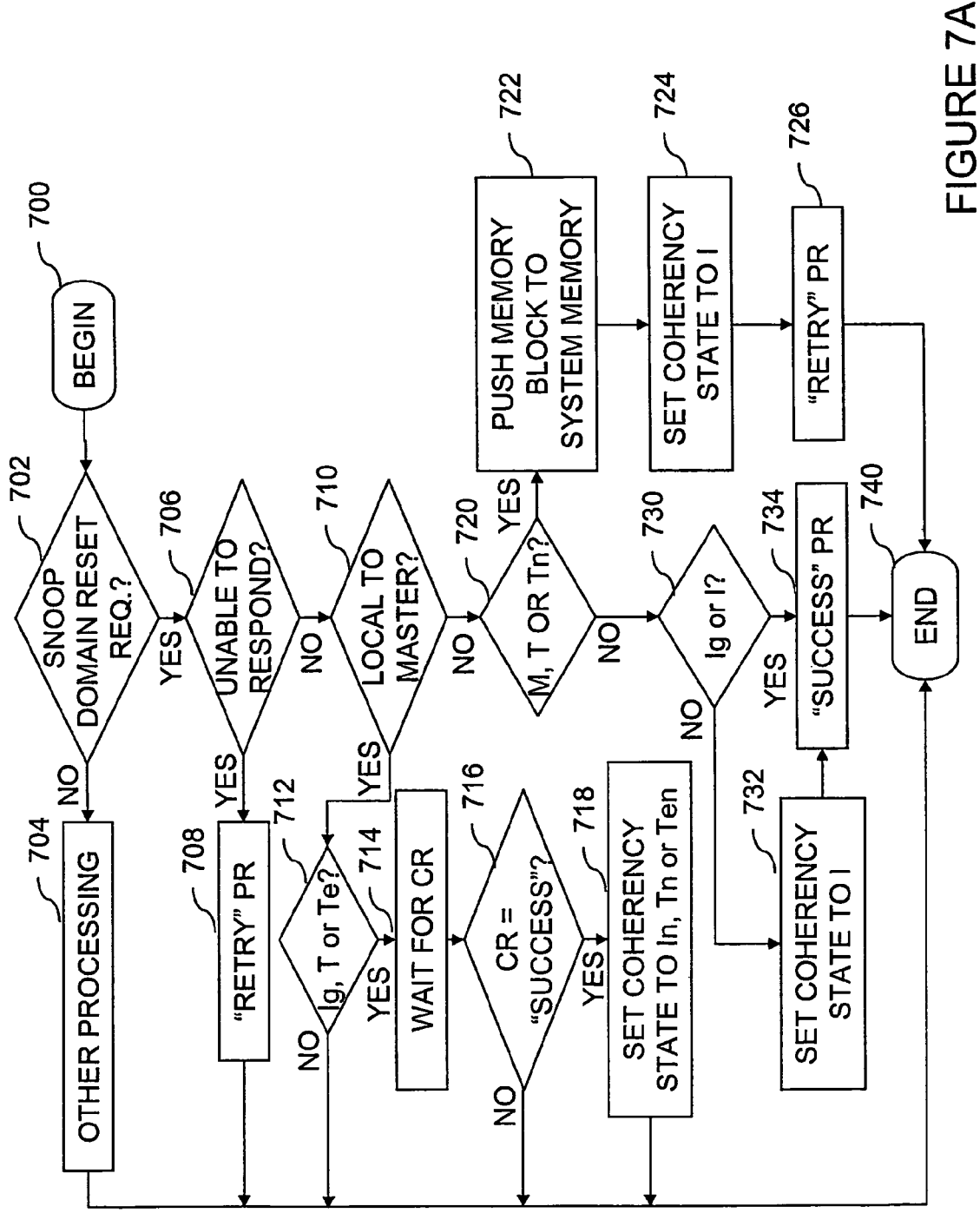
FIG. 7A is a high level logical flowchart of a method by which a cache snooper processes an active cache scrubbing operation in accordance with the present invention.

With reference now to FIG. 7A, there is illustrated a high level logical flowchart of a method by which a cache snooper, such as an L2 cache snooper 236, processes an active cache scrubbing request (i.e., domain reset request) in accordance with the present invention. As shown, the process begins at block 700 in response to receipt by an L2 cache snooper 236 of a request on its local interconnect 114. In response to receipt of the request, snooper 236 determines at block 702 whether or not the request is a domain reset request. If not, snooper 236 performs other processing, as shown at block 704, and the process ends at block 740. If, however, snooper 236 determines at block 702 that the request is a domain reset request (including a domain reset request originated by the cache scrubbing logic 250 in the same L2 cache 230), snooper 236 further determines at block 706 whether or not it is presently able to substantively respond to the domain reset request (e.g., whether it has an available instance of snoop logic and current access to L2 cache directory 302). If snooper 236 is presently unable to substantively respond to the domain reset request, snooper 236 provides a partial response (PR) indicating "retry", as depicted at block 708, and processing of the domain query request ends at block 740.

Assuming that snooper 236 is able to substantively respond to the domain query request, snooper 236 determines at block 710 whether it resides within the same coherency domain as the initiating L2 cache 230 that originally issued the domain reset request. For example, snooper 236 may make the determination illustrated at block 710 by examining the range bit (or in other embodiments, the domain identifier of the initiating L2 cache 230 or target address) contained in the domain reset request. If snooper 236 determines at block 710 that it is not within the same coherency domain as the initiating L2 cache 230, snooper 236 also determines the coherency state of the target address with respect to its L2 cache directory 302. If the L2 cache directory 302 of the snooper 236 indicates that the coherency state recorded for the memory block is I or Ig, as indicated by the process passing through blocks 720 and 730 to block 734, snooper 236 provides a partial response indicating "success". Thereafter, processing by snooper 236 terminates at block 740.

Returning to block 720, if the L2 cache directory 302 of the snooper 236 indicates that the coherency state recorded for the memory block is M, T, or Tn, meaning that the copy of the target memory block is modified with respect to system memory 108, snooper 236 updates system memory by pushing the modified memory block to system memory 108, as depicted at block 722, and updates the associated coherency state recorded in L2 cache directory 302 to I, as shown at block 724. In addition, snooper 236 provides a partial response indicating "retry," as shown at block 726, so that when the domain reset request is reissued by the initiating L2 cache 230, snooper 236 can provide a partial response indicating "success," as depicted at block 734. Following block 726, processing of the domain reset request by snooper 236 ends at block 740.

Returning to block 730, if the L2 cache directory 302 of the snooper 236 indicates that the target address has some other data-valid coherency state (e.g., Me, Te, Ten, Sr, or S), snooper 236 updates the coherency state to I, as depicted at block 732, and provides a partial response indicating "success," as shown at block 734. Following blocks 734, the process ends at block 740.

Referring back to block 710, if the snooper 236 determines that it is within the same coherency domain as (i.e., local to) the initiating L2 cache 230, snooper 236 also determines the coherency state of the target memory address with respect to its L2 cache directory 302, as illustrated at block 712. If the target memory address does not have an associated coherency state recorded within L2 cache directory 302 that provides an explicit or implicit indication that a copy of the target memory block may be cached outside of the local coherency domain (e.g., the coherency state is other than Ig, T or Te), no further processing need be performed, and the process ends at block 740. If, however, snooper 236 determines that the target memory address of the domain query request has an associated coherency state recorded within L2 cache directory 302 that provides an explicit or implicit indication that a copy of the target memory block may be cached outside of the local coherency domain (e.g., the coherency state is Ig, T or Te), snooper 236 awaits the combined response for the domain query request, as shown at block 714.

In one embodiment, response logic 210 generates the combined response in accordance with Table V, in which "Y" indicates the presence of a partial response, "X" represents a "don't care", and a dash ("–") represents the absence of a partial response.

TABLE V

| Partial Responses | Retry | Success | Combined response |
|---|---|---|---|
| Retry | Y | X | Retry |
| Success | — | Y | Success |

Thus, in this embodiment, if any snooper 236, 222 provides a partial response indicating "retry", combined response logic 210 generates a combined response indicating "retry" regardless of the presence or absence of any other partial response. If no snooper 236, 222 generates a partial response indicating "retry" and at least one snooper 236 generates a partial response indicating "success", combined response logic 210 generates a combined response indicating "success."

In response to receipt of the combined response to the domain reset request, snooper 236 determines at block 716 whether or not the combined response indicates "success" (i.e., that the target memory block is cached, if at all, only within the local coherency domain). If the combined response does not indicate "success", no further processing need be performed, and the process ends at block 740. If, however, the combined response of the domain reset request indicates "success," then snooper 236 preferably updates the entry associated with the target address in its L2 cache directory 302 from Ig to In or from T to Tn or from Te to Ten. In this manner, the coherency state of the target memory block is updated to reflect the domain information provided by the system-wide response to the domain query request. Thereafter, the process ends at block 740.

Figure 7B:
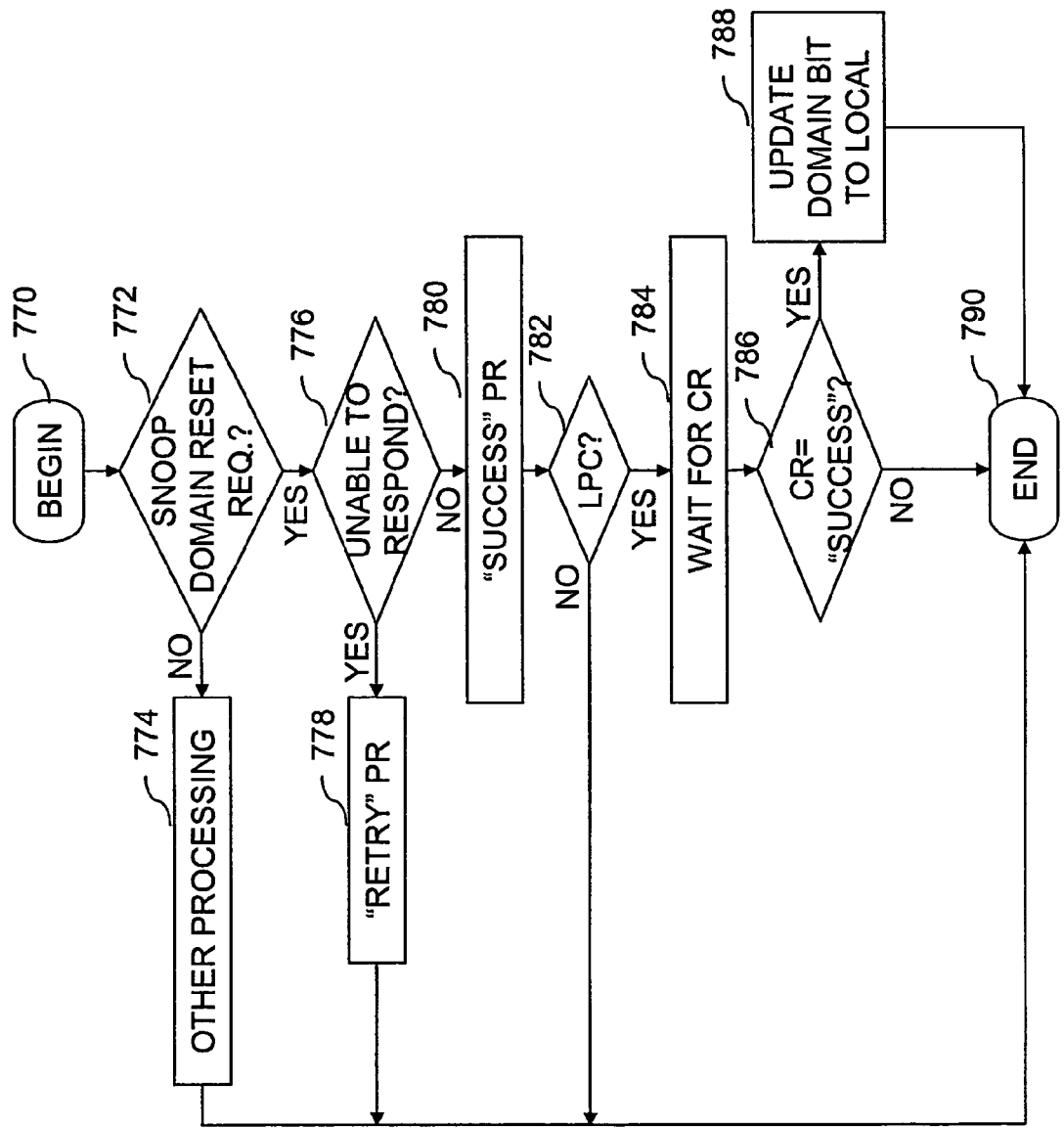
FIG. 7B is a high level logical flowchart of a method by which a memory controller snooper processes an active cache scrubbing operation in accordance with the present invention.

Referring now to FIG. 7B, there is depicted a high level logical flowchart of a method by which a memory controller snooper, such as a snooper 222, processes an domain reset request in accordance with the present invention. As shown, the process begins at block 770 in response to receipt by a memory controller snooper 222 of a request on its local interconnect 114. In response to receipt of the request, snooper 222 determines at block 772 whether or not the request is a domain reset request. If not, snooper 222 performs other processing, as shown at block 774, and the process ends at block 790. If, however, snooper 222 determines at block 772 that the request is a domain reset request, snooper 222 further determines at block 776 whether or not it is presently able to substantively respond to the domain reset request (e.g., whether it has an available instance of snoop logic). If snooper 222 is presently unable to substantively respond to the domain reset request, snooper 222 provides a partial response (PR) indicating "retry", as depicted at block 778, and processing of the domain reset request ends at block 790.

Assuming that snooper 222 is presently able to substantively respond to the domain query request, snooper 222 optionally provides a "success" partial response, as depicted at block 780, and determines whether it is the LPC for the target address, as shown at block 782. For example, snooper 222 may make the determination illustrated at block 782 by reference to BAR logic 240. If snooper 222 determines at block 782 that it is not the LPC for the target address, no further processing of the domain query request need be performed, and the process ends at block 790.

Referring back to block 782, if the snooper 222 determines that it is the LPC for the target address, snooper 222 awaits the combined response for the domain query request, as shown at block 784. In response to receipt of the combined response to the domain reset request, snooper 222 determines at blocks 786 whether or not the combined response indicates "success" (i.e., that the target memory block is cached, if at all, only within the local coherency domain). If the combined response does not indicate "success", no further processing need be performed by snooper 222, and the process ends at block 790. If, however, the combined response of the domain reset request indicates "success," then snooper 222 resets the domain indicator 504 of the target memory block in system memory 108 to indicate "local" utilizing a read-modify-write operation (block 788). In this manner, domain indicator 504 of the target memory block is updated in system memory 108 to reflect the domain information provided by the system-wide response to the domain reset request. Thereafter, the process ends at block 692.

As has been described, the present invention provides an improved data processing system, processing unit, cache hierarchy and method of data processing that scrub cache memory to update, if possible, an indication in a local coherency domain that a memory block may be cached outside of the local coherency domain. Cache scrubbing in accordance with the present invention, which may be performed in an active or passive manner, may be thus be utilized to update the coherency state of cached copies of a memory block held in the local coherency domain, as well as a domain indication at system memory.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a computer system executing program code that directs the functions of the present invention, it should be understood that present invention may alternatively be implemented as a program product for use with a data processing system. Program code defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

Furthermore, although cache scrubbing logic in accordance with the present invention has been described as a component of a cache memory, those skilled in the art will appreciate that the cache scrubbing logic may alternatively or additionally reside elsewhere within a data processing system, e.g., within a memory controller (e.g., IMC 206) or in a bus bridge, or may be implemented as a stand-alone device coupled to the interconnect fabric. In various embodiments, the cache scrubbing logic may be implemented within the capability to perform only one of passive or active cache scrubbing, or alternatively, may be implemented to selectively perform either type of cache scrubbing.

In yet another embodiment of the present invention, cache scrubbing logic 250 within an L2 cache 230 may self-initialize at block 602 of FIG. 6A to perform a cache scrubbing operation by scanning its cache directory 302 to identify target memory addresses that (1) have the coherency domain containing the L2 cache 230 as a home coherency domain and (2) are associated with an Ig coherency state or other selected coherency state having an explicit or implicit "remote" or "global" caching indication. In this embodiment, software/firmware initialization of control register(s) 252 is not required.

What is claimed is:

1. A method of data processing in a data processing system, said method comprising:
   in response to execution of program code, initializing a control register in a local coherency domain with at least a target address, wherein said program code includes an explicit domain indication scrubbing instruction having one or more operands indicating said target address, and said explicit domain indication scrubbing instruction is one of a set including a passive domain indication scrubbing instruction and an active domain indication scrubbing instruction;
   in response to said initializing, scrubbing logic in the local coherency domain issuing to at least one cache hierarchy in a remote coherency domain a domain indication scrubbing request targeting a target memory block, associated with the target address, that may be cached by said at least one cache hierarchy, wherein the domain indication scrubbing request does not request a copy of said target memory block; and
   in response to receipt of a coherency response for the domain indication scrubbing request, said coherency response indicating that said target memory block is not cached in said remote coherency domain, updating a domain indication in a system memory of said local coherency domain to indicate that said target memory block is cached, if at all, only within said local coherency domain.

2. The method of claim 1, and further comprising:
   in response to said coherency response indicating that said target memory block is not cached in said remote coherency domain, at least one cache hierarchy in said local coherency domain updating its respective coherency state for said target memory block from a first state indicating that said memory block may be cached in said remote coherency domain to a second state indicating that said target memory block is cached, if at all, only within said local coherency domain.

3. The method of claim 2, wherein said first state is a first data-invalid state and said second state is a second data-invalid state.

4. The method of claim 2, wherein said first state is a first shared state and said second state is a second shared state.

5. The method of claim 1, wherein receiving said coherency response comprises receiving a combined response representing a system-wide response to said domain indication scrubbing request.

6. The method of claim 1, and further comprising executing a domain indication scrubbing instruction to initialize said control register.

7. The method of claim 1, and further comprising:
   in response to execution of said program code, performing an I/O write operation to initialize said control register.

8. A system, comprising:
   a processor core that executes a program code that initializes a control register with at least a target address, wherein said program code includes an explicit domain indication scrubbing instruction having one or more operands indicating said target address, and said explicit domain indication scrubbing instruction is one of a set including a passive domain indication scrubbing instruction and an active domain indication scrubbing instruction;
   scrubbing logic that, responsive to initialization of said control register, issues from a local coherency domain to at least one cache hierarchy in a remote coherency domain a domain indication scrubbing request targeting a target memory block, associated with the target address, that may be held by said at least one cache hierarchy, wherein the domain indication scrubbing request does not request does not request a copy of said target memory block; and
   a snooper that, responsive to receipt of a coherency response for said domain indication scrubbing request indicating that said target memory block is not cached in said remote coherency domain, updates a domain indication in a system memory of said local coherency domain to indicate that said target memory block is cached, if at all, only within said local coherency domain.

9. The system of claim 8, and further comprising:
a cache memory including said scrubbing logic.

10. The system of claim 9, and further comprising:
at least one processor core coupled to said cache memory.

11. The system of claim 8, and further comprising:
a system memory containing the domain indication; and
a system memory controller including said snooper.

12. The system of claim 8, and further comprising:
the local coherency domain, wherein said local coherency domain includes said scrubbing logic;
said remote coherency domain containing said at least one cache hierarchy;
a cache memory in said local coherency domain that, responsive to receipt of a coherency response for said domain query request indicating that said target memory block is not cached in said remote coherency domain, updates its respective coherency state for said target memory block from a first state indicating that said memory block may be cached in said remote coherency domain to a second state indicating that said target memory block is cached, if at all, only within said local coherency domain.

13. The system of claim 12, wherein said first state is a first data-invalid state and said second state is a second data-invalid state.

14. The system of claim 13, wherein said first state is a first shared state and said second state is a second shared state.

15. A program product, comprising:
a computer usable storage medium having program code stored therein, that when processed, causes a data processing system to perform steps of:
initializing a control register within scrubbing logic in a local coherency domain with at least a target address, wherein said program code includes an explicit domain indication scrubbing instruction having one or more operands indicating said target address, and said explicit domain indication scrubbing instruction is one of a set including a passive domain indication scrubbing instruction and an active domain indication scrubbing instruction;
in response to said initializing, said scrubbing logic issuing to at least one cache hierarchy in a remote coherency domain a domain indication scrubbing request targeting a target memory block, associated with the target address, that may be cached by said at least one cache hierarchy, wherein the domain indication scrubbing request does not request a copy of said target memory block; and
in response to a coherency response for the domain indication scrubbing request indicating that said target memory block is not cached in said remote coherency domain, updating a domain indication in said local coherency domain to indicate that said target memory block is cached, if at all, only within said local coherency domain.

* * * * *